May 15, 1945.  L. F. BUCK  2,376,028
PIG RACING APPARATUS
Filed March 1, 1943
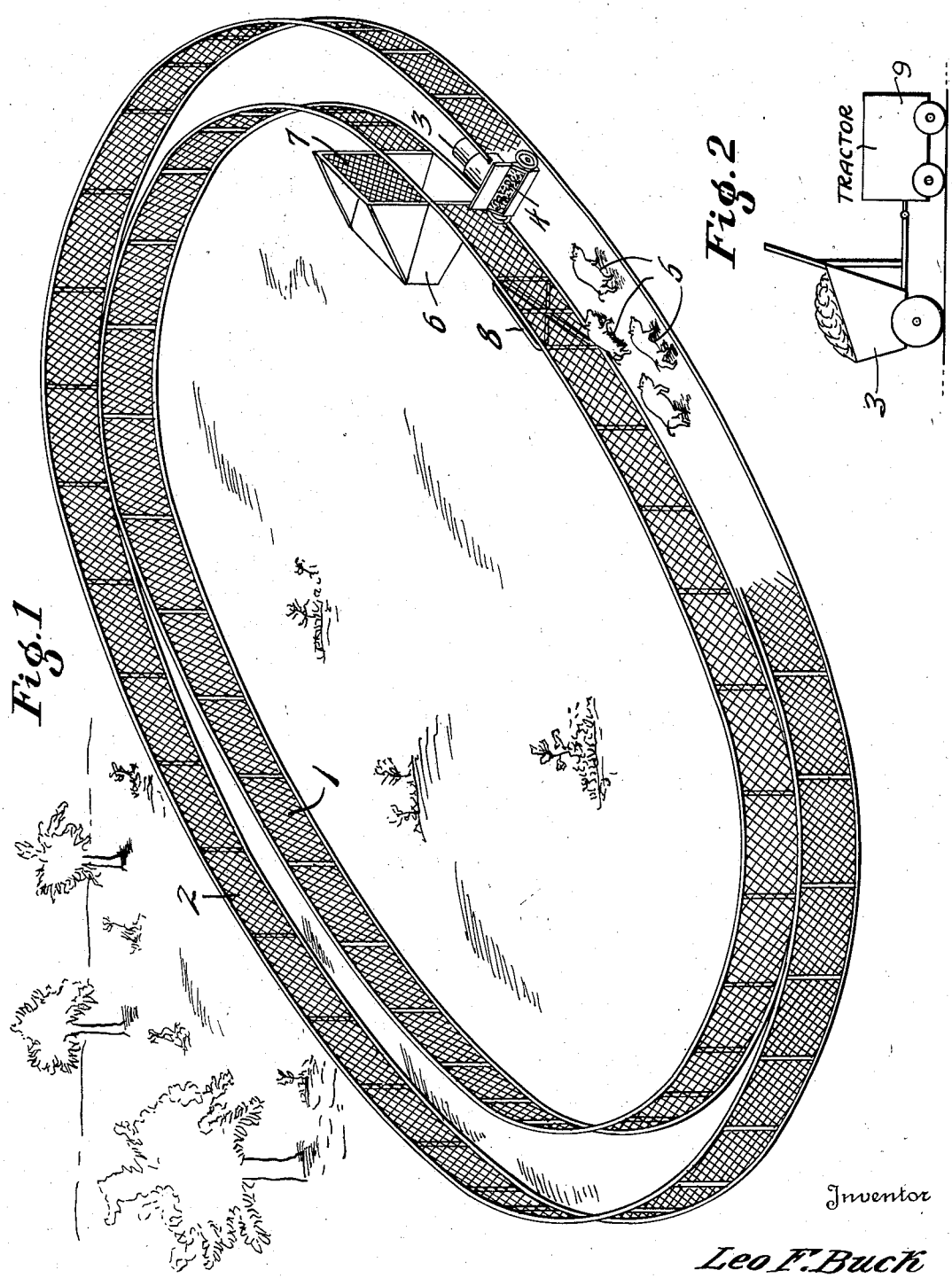
Inventor
Leo F. Buck
By Smith, Michael and Gardiner,
Attorneys Patented May 15, 1945

2,376,028

UNITED STATES PATENT OFFICE 2,376,028

PIG RACING APPARATUS

Leo F. Buck, Washington, D. C.

Application March 1, 1943, Serial No. 477,623

1 Claim. (Cl. 272—3)

This invention relates to amusement devices, and more particularly to animal-racing apparatus. The principal object of the present invention is to provide racing apparatus which creates a new and novel type of animal race that is both interesting and amusing.

Heretofore, various types of animal races have been used to appeal to and satisfy the natural race-loving instinct of the general public. Horse-racing is probably the most common type of animal race. Greyhound races have also become quite popular. Such types of animal racing hold a strong appeal for the racing-minded public, because the animals used are sufficiently large to be viewed by a great number of spectators at one time; and because these animals are fleet of foot and have a natural ever-alert racing sense.

These popular types of animal races are, however, subject to the objection that they require the use of large tracts of ground and expensive equipment or apparatus, necessitating their being located permanently in one place. Even if it were possible to move the apparatus which is used in these races, the required space for such apparatus is not generally available. These types of animal races do not, therefore, fulfill the need for an appealing animal race which will require only a relatively small amount of space, a relatively small capital outlay, and an apparatus which may be readily moved about from place to place and set up in any of the numerous comparatively small vacant plots that are generally available.

I have found that razor-back pigs, which inhabit the wilds of the South, have the necessary characteristics to adapt them for racing in relatively small areas with inexpensive, portable equipment. These pigs vary in size and their size generally is dependent upon their age. Preferably, small young pigs are used, as they are lean and fleet, with an alertness for detecting the presence of food and a dormant racing aptitude which may be readily aroused and brought into activity by appealing to their natural gluttonous instinct.

The type of animal herein contemplated is not to be confused with the ordinary domesticated pig found on farms and in like places, the two species of pigs being entirely different one from another.

With the general object and purpose of the invention clearly in mind, the construction of a preferred form of the apparatus may be fully understood by reference to the accompanying drawing, in which Fig. 1 is a perspective view of an animal-racing apparatus embodying the features of my present invention, a portion thereof being broken away for clarity of illustration, and Fig. 2 is a side elevation of the lure of my present invention, showing a preferred means, such as a tractor, for pulling or drawing the lure around the track.

Referring to the drawing, the apparatus comprises essentially a race course or track, preferably of a generally oval type, over which the animals may run and which is defined by substantially parallel inner and outer fences 1 and 2, spaced apart a predetermined distance. The size of the race course is largely a matter of choice as is also the width thereof but, in all cases, the course or track will be relatively small as compared with those of common types of animal race courses above mentioned. The width of the course or track will be governed largely by the number of animals which it is generally desired to race.

The fences defining the course or track may be formed of conventional wire fencing of a foraminous nature which, while confining the animals to the course, will not obstruct the view of spectators and will provide for sufficiently clear vision of the entire course from all points of observation. It will be understood, of course, that any fence or wall structure which satisfactorily serves the desired purpose may be used. While the fences may be constructed permanently, it is preferred to have the apparatus of a portable nature so that it may be moved about from place to place, and to this end the fences are preferably composed of detachable sections that may be readily assembled in cooperative relation and later detached for removal, and anchored to the ground in any suitable manner, for example, by posts driven into the ground between or at the joints of the sectional fence.

In order to arouse the racing instinct of the razor-back pigs and to induce them to participate in a race about the course or track, there is provided a vehicle 3 which is preferably of slightly less width than the width of the course and which is adapted to move about the course or track under the influence of a suitable propelling force. The vehicle may be moved by any suitable source of power. It may be drawn by man or animal or it may be propelled by some form of engine located either on the vehicle itself or on another vehicle connected to the first-mentioned vehicle. For example, an internal combustion engine or an electric motor might be mounted directly upon the vehicle 3 or upon a vehicle connected thereto. In Fig. 2 there is illustrated, more or less diagrammatically, a tractor 9 connected to the lure or vehicle 3, which tractor is adapted to pull or draw said lure or vehicle around the race course or track in advance of the animals participating in the race. This tractor may be of any preferred or desired construction. If an electric motor is used on the vehicle 3 or tractor 9, storage batteries may be employed on the vehicle or tractor as the source of power, otherwise it will be necessary to provide for the conducting of electrical energy to the motor from a remote source. This may be done in the conventional manner by providing tracks and a trolley wire or third rail conductor.

The vehicle 3 carries or has formed integrally therewith a food receptacle or container 4, which preferably takes the form of a trough extending transversely of the vehicle and of the race course. The trough-like container may extend substantially the width of the vehicle, as shown. This receptacle or container is adapted to receive food which should be preferably of a type that is most alluring to the particular animals used. As the food-containing vehicle moves about the race course or track, the razor-back pigs are induced to follow the same and compete with each other in their efforts to attain access to the food in the trough 4. Several such animals are shown racing over the course at 5.

While the type of race in question may be started or stopped in any desired manner, the apparatus illustrated is particularly designed for this purpose. Near one end, and preferably at one side of the race course or track and having direct communication therewith, is a pen or closure 6, which, if desired, may include a plurality of individual stalls, having a movable gate 7 extending across the open front of the pen 6, or common to all of the stalls or individual compartments thereof, and closing the same. The pigs which are to race in any particular instance are confined in the pen 6 or in the individual stalls thereof. The vehicle 3 may be normally positioned at the far side of the gate 7, after which the pigs may be released from the pen by turning or raising the gate 7, permitting the pigs to line up along the trough 4. The vehicle is then started and is run about the race course ahead of the pigs and their natural gluttonous instinct will cause them to follow the traveling food lure.

If desired, the vehicle 3 may be started around the track from a point ahead of the gate 7 and when the vehicle is running at the desired speed and reaches a point directly in front of the starting pen or stalls, the gate 7 may be quickly opened by raising or removing in any suitable manner, and the confined pigs thus released to race into and around the track in pursuit of the moving food lure.

It is preferred to have a race consist of one or more laps about the race course and in order to provide for the finish of the race and to lead the pigs from the course after the finish, there may be provided a second gate 8 in advance of the pen 6 which may be hingedly mounted to be swung into a transverse position across the race course.

The finish line may be in the vicinity of this second gate and after the pigs have crossed such line, the vehicle may be stopped, preferably at the far side of or beyond the gate 7, and the pigs allowed to consume the food in the trough 4. At the same time, the second gate 8 may be swung across the track to confine the pigs to the portion of the track in front of the pen 6, whereby, upon opening the gate 7, the pigs may be readily urged into the pen 6 where they may be again confined by closing the gate 7.

The type of animal race which is contemplated and herein disclosed provides all the amusement and thrill of any of the well known types of animal races, and in addition thereto, due to the destructive characteristics of the participating animals, creates a novelty that will not only allure the confirmed racing-minded public but will attract and amuse a large part of the general public not ordinarily given to attending horse and dog races, and at the same time fulfills the need for an animal race requiring but small space, wherein portable inexpensive apparatus may be used. The invention is, of course, subject to modifications as to the details, and any such modifications as fall within the scope of the appended claims are to be deemed a part of the invention.

Obviously, the trough 4 may be provided with a lid to be closed as the pigs cross the finish line, to prevent their becoming satisfied and thereby reluctant to participate in a subsequent race; or the trough may be permanently closed to access by the pigs by a grate or screen so that the pigs cannot at any time partake of the food lure carried by the vehicle 3, for like reasons.

I claim:

A lure for causing gluttonous animals, such as razor-back pigs, to race, comprising a vehicle provided with an open trough-like receptacle extending substantially the width of the vehicle for carrying a food lure which is appealing to the gluttonous instinct of said animals and a motor for propelling said vehicle along a race course.

LEO F. BUCK.